US011976636B1

(12) United States Patent
Gregory et al.

(10) Patent No.: US 11,976,636 B1
(45) Date of Patent: May 7, 2024

(54) CONTROLLER AND METHOD FOR A WIND TURBINE

(71) Applicant: VESTAS WIND SYSTEMS A/S, Aarhus N. (DK)

(72) Inventors: Karl Gregory, Cowes (GB); Keld Rasmussen, Herning (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 18/011,085

(22) PCT Filed: Jun. 15, 2021

(86) PCT No.: PCT/DK2021/050195
§ 371 (c)(1),
(2) Date: Dec. 16, 2022

(87) PCT Pub. No.: WO2021/254579
PCT Pub. Date: Dec. 23, 2021

(30) Foreign Application Priority Data

Jun. 19, 2020 (DK) .......................... PA 2020 70404

(51) Int. Cl.
*F03D 80/40* (2016.01)

(52) U.S. Cl.
CPC .......... *F03D 80/40* (2016.05); *F05B 2270/32* (2013.01); *F05B 2270/325* (2013.01); *F05B 2270/335* (2013.01)

(58) Field of Classification Search
CPC ... F03D 80/40; F03D 80/405; F05B 2270/335
See application file for complete search history.

(56) References Cited

U.S. PATENT DOCUMENTS 8,292,579 B2 * 10/2012 Magnuson .............. F03D 80/40 416/61
9,518,561 B2 * 12/2016 De Boer ................ F03D 80/40
2006/0034692 A1 2/2006 Grabau
2012/0134804 A1 5/2012 Magnuson
2015/0023792 A1 1/2015 Spitzner et al.
(Continued)

FOREIGN PATENT DOCUMENTS

CA 2859633 A1 6/2013
CN 206988029 U 2/2018
EP 2778404 A1 9/2014
(Continued)

OTHER PUBLICATIONS

Danish Patent Office, Search Report for Danish Patent Application No. PA 2020 70404, dated Dec. 21, 2020.
(Continued)

*Primary Examiner* — Justin D Seabe
*Assistant Examiner* — John S Hunter, Jr.
(74) *Attorney, Agent, or Firm* — Patterson + Sheridan, LLP

(57) ABSTRACT

A method of activating an ice removal system of a wind turbine comprises: monitoring the output power of the wind turbine; monitoring an output from an ice sensor provided on the wind turbine indicative of an atmospheric icing condition; and activating the ice-removal system when the output power is below an expected output power and the output from the ice sensor indicates that an atmospheric icing condition has ended.

15 Claims, 3 Drawing Sheets

(56) References Cited

U.S. PATENT DOCUMENTS

| | | | |
|---|---|---|---|
| 2017/0226990 | A1 | 8/2017 | Arlaban Gabeiras et al. |

FOREIGN PATENT DOCUMENTS

| | | | |
|---|---|---|---|
| EP | 2913520 | A1 | 9/2015 |
| EP | 3165766 | A1 | 5/2017 |
| WO | 2018113889 | A1 | 6/2018 |

OTHER PUBLICATIONS

Danish Patent Office, Search Opinion for Danish Patent Application No. PA 2020 70404, dated Dec. 21, 2020.

International Search Report and Written Opinion for PCT Application No. PCT/DK2021/050195, dated Oct. 1, 2021.

* cited by examiner

CONTROLLER AND METHOD FOR A WIND TURBINE

TECHNICAL FIELD

Aspects of the invention relate to techniques, apparatus and methods for monitoring a wind turbine structure, particularly but not exclusively a wind turbine blade.

BACKGROUND

Wind turbines are normally provided with a rotor in the form of a rotatable hub carrying a set of wind turbine blades. The wind acts on the wind turbine blades, thereby causing the hub to rotate. The rotational movements of the hub are transferred to a generator, either via a gear arrangement or directly, in the case that the wind turbine is of so-called direct drive type. In the generator, electrical energy is generated, which may be supplied to a power grid.

It is common for wind farms including a number of wind turbines to be situated in geographical locations in which atmospheric temperatures often drop below freezing. Such a 'cold climate' increases the risk of ice forming on the components of a wind turbine, in particular on the rotor blades of the wind turbine. This may not only reduce the efficiency of the wind turbine, but the risk of ice being thrown from the rotor blades as they rotate increases, which can pose a risk to personnel in the vicinity of the wind turbine and which can potentially cause damage to the wind turbine itself or to other wind turbines in the vicinity. For these reasons, wind turbines are usually provided with systems for detecting the presence of ice at the wind turbine, in addition to systems for removing ice from the wind turbine rotor blades or other components in the event that ice build-up is detected.

The present invention has been devised against this background.

SUMMARY OF THE INVENTION

In one aspect, the invention provides a method of activating an ice removal system of a wind turbine. The method comprises: monitoring the output power of the wind turbine; monitoring an output from an ice sensor provided on or in the vicinity of the wind turbine and indicative of an atmospheric icing condition in the vicinity of the wind turbine; and activating the ice-removal system when the output power is below an expected output power and the output from the ice sensor indicates that an atmospheric icing condition has ended.

In this way, the time at which the ice-removal is triggered to activate is optimised and the need for repeated de-icing is avoided since the ice-removal system is only activated once it is determined that an icing event has finished. De-icing uses power thus reducing the efficiency with which power can be generated by the wind turbine. It is therefore beneficial to de-ice the wind turbine once at the end of an ice build-up phase rather than repeatedly during the existence of an atmospheric icing condition.

The method may comprise monitoring ambient temperature and activating the ice-removal system only when the ambient temperature is in a pre-determined range. This prevents the ice-removal system from being triggered in a scenario in which it is too cold, for ice-removal to be effective.

The method may comprise activating the ice-removal system only when the ice sensor output indicates that the atmospheric icing condition has been ended for a pre-determined period of time. This helps to ensure that the atmospheric icing condition, during which ice is accumulating, has fully finished for a pre-determined period of time before triggering the ice-removal system.

The method may comprise activating the ice-removal system only: when the output power has been determined to be below the expected output power for a first pre-determined period of time to help ensure against anomalous drops in power production, or when the output power has been substantially zero for a prescribed percentage of a second pre-determined period of time. The latter condition being indicative of a wind turbine which has stopped due to ice build-up. Advantageously, the second period of time is less than the first period of time so that a stopped 'iced-up' wind turbine can be de-iced and put back into operation as soon as efficiently possible.

Monitoring the output from the ice sensor may comprise receiving data derived from the ice sensor at a discrete series of time intervals. Correspondingly, monitoring the output power of the wind turbine may comprise receiving data indicative of the output power from the wind turbine at a discrete series of time intervals.

In some examples, monitoring the output power of the wind turbine may comprise receiving primary power data indicative of the output power from the wind turbine at a discrete series of time intervals of a first window. In this case, the method may comprise receiving primary power data for multiple, consecutive, first windows.

The method may comprise calculating an average primary output power for each first window using the corresponding primary power data for each first window. The method may further comprise determining an average actual power of the wind turbine by calculating the average value of the average primary output powers.

Averaging the output power of the wind turbine over a first time window, and over a number of first time windows, is advantageous because it prevents small fluctuations in these parameters from triggering activation of the de-icing system before it is necessary. In other words, averaging the output power in this way guards against false triggering of the de-icing system.

The primary power data may be received by the controller at the end of the or each first window.

The method may comprise receiving primary wind speed data from at least one wind speed sensor, wherein the primary wind speed data is indicative of the wind speed in the vicinity of the wind turbine at the discrete series of time intervals of the first window.

The method may further comprise receiving primary wind speed data for multiple, consecutive, first windows. In this case, the method may comprise calculating an average primary wind speed value for each first window using the corresponding primary wind speed data for each first window.

The method may comprise determining a second average wind speed value by calculating the average value of the average primary wind speed values for each first window.

The method may comprise determining an expected power of the wind turbine based on the second average wind speed value.

Similarly to the averaging process used to calculate the actual output power, averaging the wind speed values in this was correspondingly prevents fluctuations in the wind speed from resulting in an unrepresentative expected output power, which may otherwise cause triggering of the de-icing system when not required.

The method may comprise comparing the average actual power with the expected power, and determining a difference data point, wherein the difference data point is the difference between the average actual power and the expected power.

The method may comprise comparing the difference data point with a threshold value to determine if the expected power exceeds the average actual power by an amount greater than the threshold value; and activating the ice-removal system if the expected power exceeds the actual power by an amount greater than the threshold value.

In an example, the threshold value is dependent on the second average wind speed value. According to this example, the method may comprise grouping different values of the second average wind speed into two or more bins, wherein each bin has a different associated threshold value.

In an example, the primary wind speed data is received by the controller at the end of the or each first window.

In an example, the duration of the or each first window is ten minutes.

The method may comprise comparing the difference data point with a threshold to determine if the average actual power is less than the expected power by an amount greater than the threshold value; and activating the ice-removal system if the average actual power is less than the expected power by an amount greater than the threshold.

Alternatively, or additionally, the method may comprise comparing the average actual power to a threshold value; and activating the ice-removal system based upon the comparison.

The threshold value may be dependent on the second average wind speed value in some embodiments. Different values of the second average wind speed may be grouped together in two or more bins, wherein each bin has a different associated threshold value. In other embodiments, the threshold value may be the same for all second average wind speed values, such that the threshold value is independent of the second average wind speed value.

The primary wind speed data may be received by the controller at the end of the or each first window. The duration of the or each first window may be ten minutes in some embodiments, but of course in other embodiment the duration of the or each first window may vary.

In another aspect, the invention resides in a controller for an ice-removal system of a wind turbine. The controller comprises: an input configured to receive data derived from an ice sensor indicative of the existence of an atmospheric icing condition; an input configured to receive data indicative of the power output of the wind turbine; and a processor. The processor is configured to determine: whether a time period in which an atmospheric icing condition exists has ended; and whether the output power of the wind turbine is below an expected output power. The processor is configured to issue an output control signal to activate the ice-removal system when it is determined that the output power is below the expected output power and the atmospheric icing condition has ended. Thus, the controller provides for triggering of the ice-removal system at a time at which ice-removal will be most efficient and effective.

The controller may comprise an input configured to receive data derived from a temperature sensor indicative of ambient temperature. The controller may be configured to issue the control signal only if the ambient temperature is determined to be in a pre-determined range.

The controller may be configured to issue the control signal only when the ice sensor data indicates that the atmospheric icing condition has been ended for a pre-determined period of time.

The controller may be configured to issue the control signal only when the output power is determined to have been below the expected output power for a pre-determined period of time or when the output power is determined to have been substantially zero for a prescribed percentage of a second period of time. Advantageously, the second period of time is less than the first period of time.

The controller may be configured to perform the method of any of the preceding paragraphs.

In another aspect, the invention resides in a control system comprising a controller according to any of the preceding paragraphs and an ice detector.

In another aspect, the invention resides in a wind turbine comprising a controller or the control system described in the preceding paragraphs.

BRIEF DESCRIPTION OF THE DRAWINGS

The invention will now be described by way of example with reference to the accompanying drawings, in which.

DETAILED DESCRIPTION

The following detailed description refers to the accompanying drawings that show, by way of illustration, specific details and embodiments in which the invention may be practiced. These embodiments are described in sufficient detail to enable those of ordinary skill in the art to practice the invention. Other embodiments may be utilised, and structural changes may be made without departing from the scope of the invention as defined in the appended claims.

Figure 1:
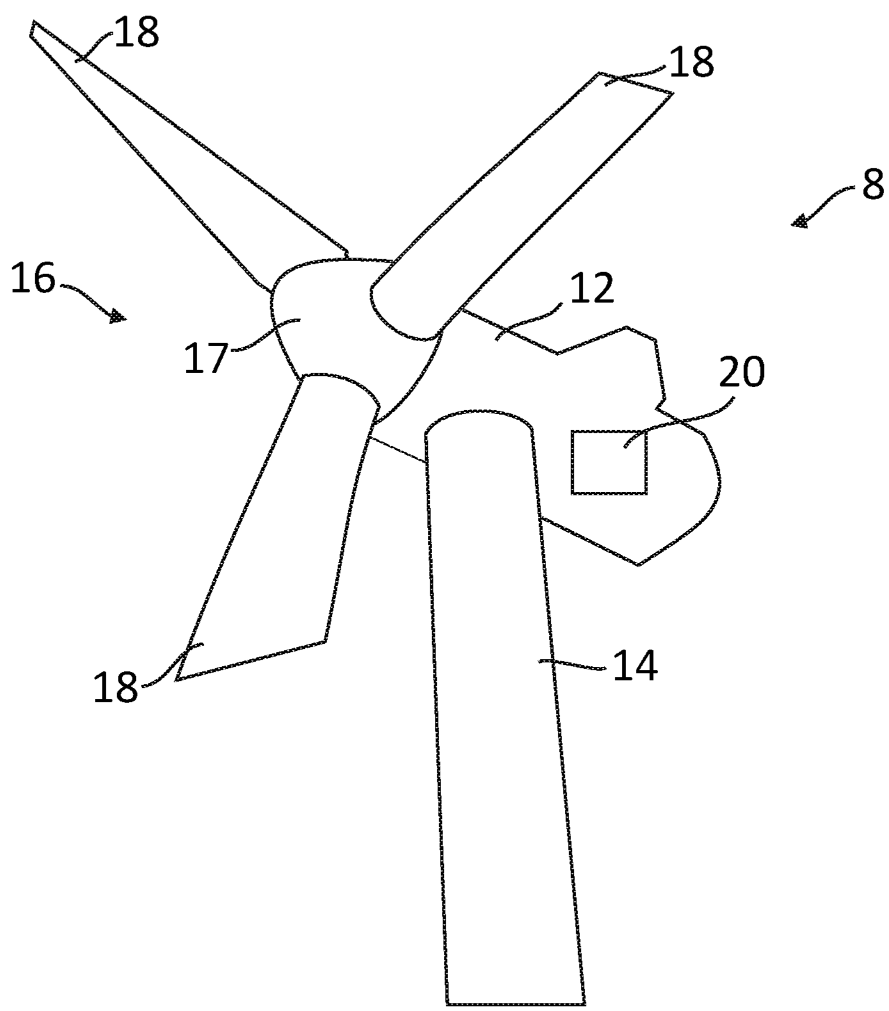
FIG. 1 is a schematic diagram of a wind turbine having a controller in accordance with an embodiment of the invention.

FIG. 1 shows a wind turbine 8 in accordance with an embodiment of the invention. The wind turbine 8 includes a nacelle 12 that is supported on a generally vertical tower 14, which is itself mounted to a foundation (not shown). The nacelle 12 houses a number of functional components, including a gearbox and a generator (not shown), and supports a main rotor arrangement 16. The main rotor arrangement 16 comprises a hub 17 and a plurality of wind turbine blades 18 received in blade-receiving apertures (not shown) of the hub 17. In this example, the wind turbine 8 comprises three wind turbine blades 18.

Figure 2:
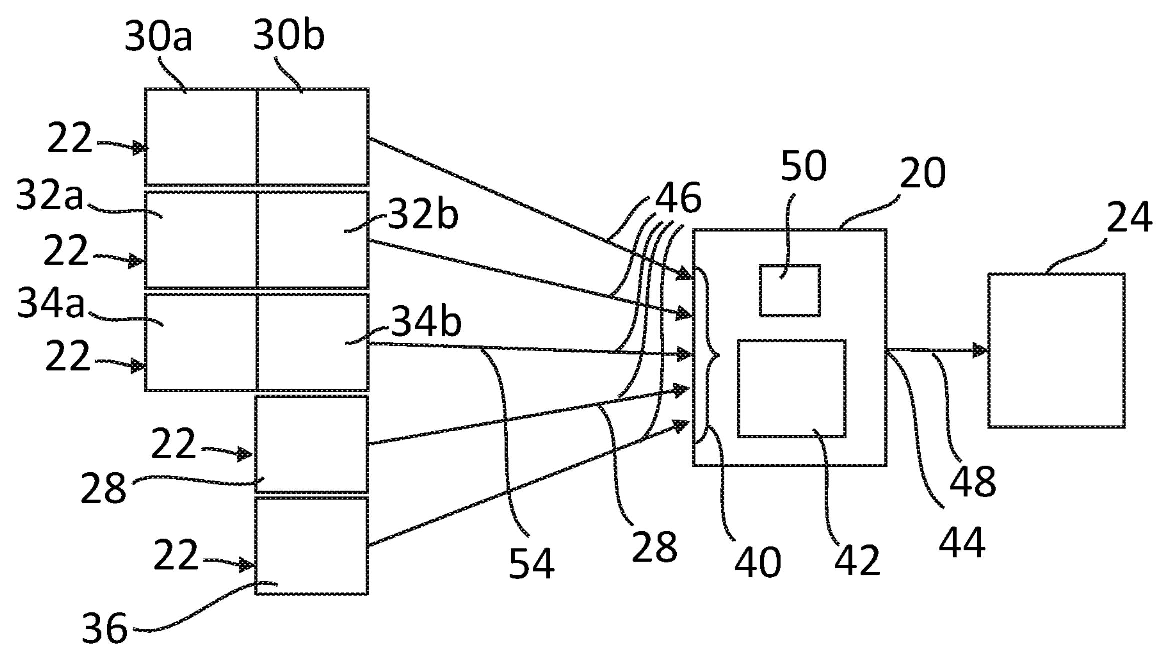
FIG. 2 is a schematic diagram showing the controller of FIG. 1, in addition to a plurality of sensors and an ice-removal system.

The wind turbine 8 also includes a controller 20, a plurality of sensors 22, and an ice-removal system 24, as shown in schematic form in FIG. 2. As will be explained, the controller 20 monitors the output power of the wind turbine 8 and an output 26 from an ice sensor 28 provided on top of the nacelle 12 of the wind turbine 8, and activates the ice-removal system 24 based on these values. Specifically, as will be explained, the controller 20 is configured to trigger activation of the ice-removal system 24 when it is determined that ice is present, but no longer accumulating, on the wind turbine 8, and that the output power of the wind turbine 8 is below an expected output power.

The plurality of sensors 22 include a current sensor 30*a*, a voltage sensor 30*b*, first and second wind speed sensors 32*a*, 32*b*, first and second temperature sensors 34*a*, 34*b*, an air pressure sensor 36, and the ice sensor or detector 28.

The current sensor 30*a* is configured to measure values of the current on the output of the wind turbine 8 during operation of the wind turbine 8. The voltage sensor 30*b* is configured to measure values of the voltage on the output of the wind turbine 8 during operation of the wind turbine. The output power generated by the wind turbine 8 can be calculated based on the values of current and voltage measured by the current and voltage sensors 30*a*, 30*b*, as will be understood by the skilled person. It should also be understood that any sensor or arrangement that can measure or determine the output power of the wind turbine 8 may be used in addition to, or as an alternative to, the current and voltage sensors 30*a*, 30*b* of the present embodiment.

Each of the wind speed sensors 32*a*, 32*b* is configured to measure values of the wind speed in the vicinity of the wind turbine 8. The wind speed sensors 32*a*, 32*b* may be in the form of force-torque sensors. Typically, wind speed sensors are mounted atop the nacelle 12 of the wind turbine 8, and are in the form of anemometers. Anemometers come in various different types, for example cup, vane, hot-wire, laser-Doppler and ultrasonic anemometers. Ultrasonic sensors may be preferred on wind turbines that are difficult to access, for example off-shore, as they do not need recalibration. In particular, ultrasonic sensors measure wind speed based on a time-of-flight of sonic pulses between pairs of transducers.

Each of the temperature sensors 34*a*, 34*b* is configured to measure values of the ambient temperature in the vicinity of the wind turbine 8. The temperature sensors 34*a*, 34*b* may for example be mounted to the nacelle 12 of the wind turbine 8. In a different example, temperature sensors 34*a*, 34*b* may be located elsewhere in a wind park comprising the wind turbine 8, and the ambient temperature for all of the wind turbines 8 in the wind park may be based on the data measured by the temperature sensors 34*a*, 34*b*. The air pressure sensor 36 is mounted to the hub 17 in this embodiment, although may be provided elsewhere in other embodiments.

The ice sensor 28 is provided at the top of the nacelle 12 in this embodiment, although could be provided in another suitable position in other embodiments. In one embodiment, the ice sensor 28 could be located in the vicinity of the wind turbine 8, or wind park comprising the wind turbine 8, and the activation of the ice removal system 24 may be based on the data measured by the ice sensor 28.

The ice sensor 28 is operable to determine whether ice is accumulating on the wind turbine 8. In this example, the ice sensor 28 is based on an ultrasonic principle. Ultrasonic signal attenuates when ice is present on a sensor wire of the ice sensor 28, allowing ice to be detected in the vicinity of the wire. When ice is detected by the ice sensor 28, the temperature of the wire, which also acts as a heating element, is increased to remove the ice. The ice sensor 28 repeatedly performs measurements to determine if ice is present, and removes the detected ice by heating. During an atmospheric (or meteorological) period, i.e. an ice-accumulation period in which ice is accumulating on the wind turbine 8, the ice sensor 28 repeatedly measures ice and sends a signal to the controller 20 to indicate that ice is present on the turbine 8. Because the ice sensor 28 repeatedly removes the accumulating ice by heating, the ice sensor 28 is configured to recognise when ice stops accumulating, i.e. when the atmospheric icing condition no longer exists. At this time, the ice sensor 28 sends a signal to the controller 20 to indicate that the atmospheric icing period has finished. It will be understood that the ice sensor 28 may take many different forms, and is not limited to being this particular ice sensor 28, or this particular type of ice sensor 28.

Alternatively or additionally, the ice sensor 28 may be a blade-based ice detection system measuring the vibration pattern or frequency response of the wind turbine blades 18. In this case, because the vibration pattern or frequency response of the blades 18 is dependent on the mass of ice accumulating on the blades 18, monitoring of these parameters over time can provide an indication that an atmospheric icing condition that had previously been in existence no longer exists, and thus that an atmospheric icing event has ended.

For example, if it is determined that the measured vibration pattern has stabilised, and remained stable for a given period of time (e.g. 60 minutes), then this may indicate that the mass of ice on the blade 18 has stopped increasing, and hence that an atmospheric icing event has ended. The measured vibration pattern may also indicate a reduction in the mass of ice on the blade, thereby indicating that an atmospheric icing event has finished.

A further alternative or additional sensor that may be used in the system is an ice sensor 28 that detects the thickness of ice on the blade 18. In this case, the system may determine that an atmospheric icing event has ended when the measured thickness has not increased, or has decreased, over a given period of time (e.g. 60 minutes).

Turning now to the controller 20, this includes a plurality of inputs 40, a processor 42 and an output 44. The inputs 40 are configured to receive sensor output data 46 from the sensors 22. Although not explicit in FIG. 2, the data output from the sensors 22 is sent to the controller 20 indirectly in this embodiment, wherein the controller forms part of a Data Supervision, Control and Data Acquisition (SCADA) system (not shown) that collects and stores data from the sensors 22 of the wind turbine 8, and sends time averaged data from the required sensors 22 to the controller 20 every ten minutes. The processor 42 is configured to determine whether or not the ice-removal system 24 should be activated, in dependence on the received sensor output data 46, as will be explained. The output 44 is configured to send a control signal 48, in the form of an activation signal, to the ice-removal system 24, to activate the ice removal system 24. The controller 20 additionally comprises a memory device 50, such as a non-transitory, computer-readable medium. The memory device 50 of the controller 20 stores a reference power curve for the wind turbine 8, which indicates the expected power output for the wind turbine 8 at different wind speeds. The memory device 50 also stores instructions that when executed by the processor 42 causes the processor 42 to carry out a method as described below.

The ice removal system 24 of this embodiment is located in the hub 17 of the wind turbine 8, and is operable to capture, heat and propel air through outlets in each of the wind turbine blades 18, so as to circulate hot air in the blades 18 and heat them internally. It will be understood that the ice removal system 24 may take many different forms, and is not limited to this arrangement, or to being this specific type of ice-removal system 24. As one example, the ice-removal system 24 may instead comprise heating elements that are integrated into the blades 18.

Figure 3:
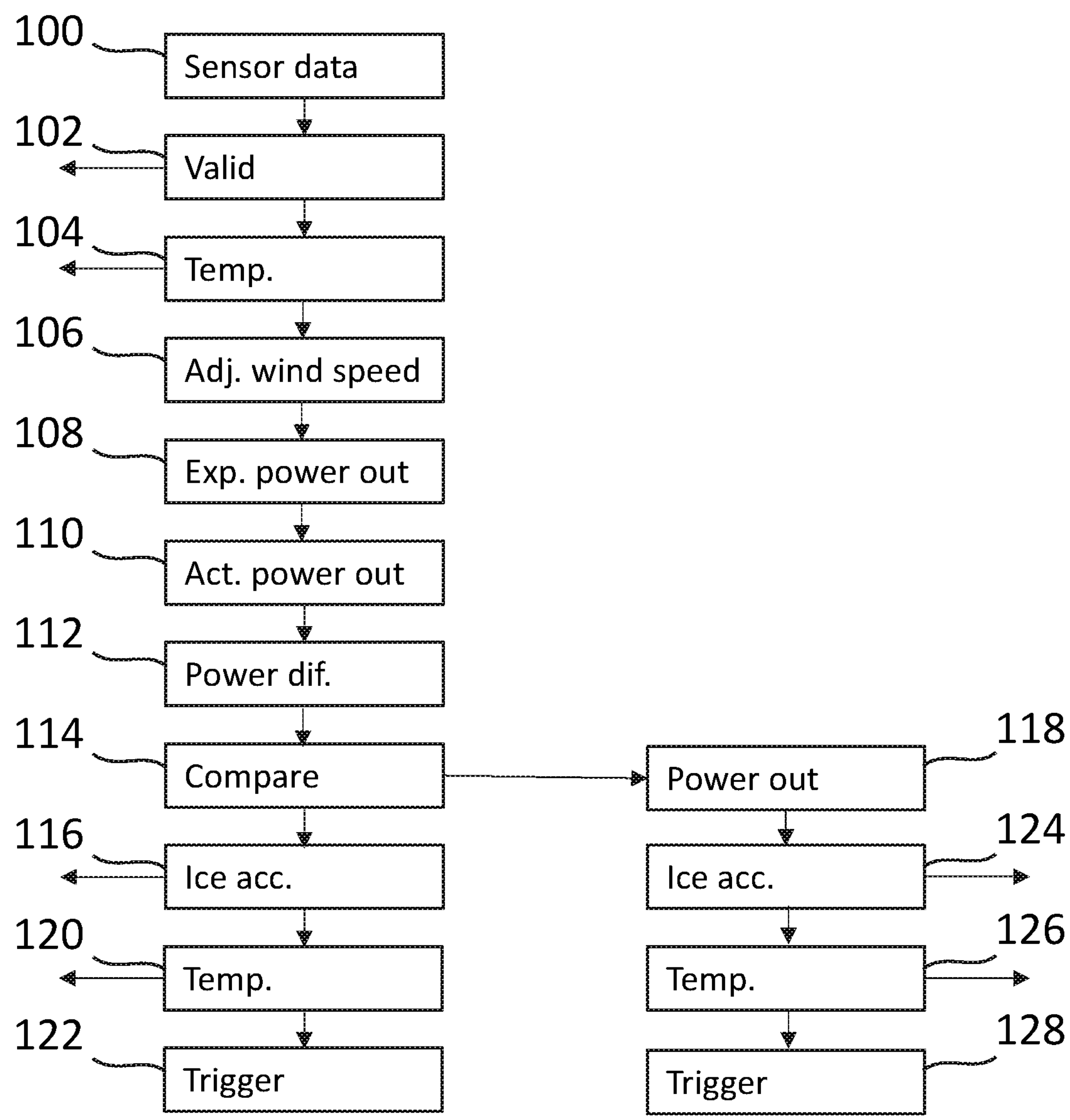
FIG. 3 shows the steps of a method undertaken by the controller of FIG. 1.

FIG. 3 shows the steps of a method undertaken by the controller 20 in order to determine whether the ice removal system 24 of the wind turbine 8 should be activated. It should be noted that, in practice, this method can be carried out at any suitable frequency, preferably every ten minutes or every minute, by the controller 20, on receipt of data originating from the sensors 22.

The method begins at step 100, when the input 40 of the controller 20 receives sensor output 54 originating from the temperature sensors 34*a*, 34*b* and the wind speed sensors 32*a*, 32*b*, respectively. The controller 20 receives this data via the SCADA system of the wind turbine 8, rather than directly, in this embodiment.

At step 102, the controller 20 determines if the data received at step 100 is complete and valid. The data is determined to be complete if the controller 20 receives all of the expected data from the sensors 22. If, for example, data from one or more of the temperature sensors 34*a*, 34*b* and/or the wind speed sensors 32*a*, 32*b* is not received, then the controller 20 determines that the sensor data is not complete.

There are numerous different ways in which the sensor data may be determined to be invalid, as will be understood by the skilled person. In this example, the wind turbine 8 includes two temperature sensors 34*a*, 34*b* and two wind speed sensors 32*a*, 32*b* to enable validation of the data received from these sensors. The particular setup or layout of the sensors 32*a*, 2*b*, 34*a*, 34*b* and the particular manner in which the measured data is validated may vary, as will be understood by the skilled person. For example, the first and second temperature sensors 34*a*, 34*b* may in fact be a sensor having two channels 34*a*, 34*b*. In this case, a check may be made to ensure that the signal received from each of the channels 34*a*, 34*b* is the same, or substantially the same within a given error window, so as to validate the measured data. A similar process may be undertaken for the data originating from the first and second wind speed sensors 32*a*, 32*b*, which may correspondingly in fact be a sensor having two channels 32*a*, 32*b*.

If the sensor data is determined by the controller 20 to be incomplete and/or invalid, then the method terminates without triggering activation of the ice-removal system 24.

If the sensor data is determined to be both complete and valid, then the method proceeds to step 104. At step 104, the processor 42 determines if the temperature at the wind turbine 8 is above or below a certain prescribed temperature, or within a certain prescribed range of temperatures. In this example, the processor 42 determines whether the ambient temperature in the vicinity of the wind turbine 8, as measured by the temperature sensors 34*a*, 34*b*, is greater than or less than a prescribed threshold ambient temperature. The threshold ambient temperature may be a value above which it is unlikely, or impossible, for ice to form and be present at the wind turbine 8. In this example, the threshold ambient temperature is approximately 0 degrees Celsius; however, any suitable threshold ambient temperature may be used.

If at step 104 the processor 42 determines that the ambient temperature is above the threshold temperature then the processor 42 determines that no ice is present at the wind turbine 8, and the method is terminated without activating the ice removal system 24. If the processor 42 determines that the ambient temperature is below the threshold temperature, then the processor 42 determines that ice may be present at the wind turbine 8 and the method continues to step 106.

At step 106, the controller 20 receives data from the air pressure sensor 36 indicative of the air pressure in the vicinity of the wind turbine 8, and the processor 42 computes a ninety minute average adjusted wind speed value, $WS_{avg,90}$, using the data from the wind speed sensors 32*a*, 32*b* and the air pressure sensor 36 as follows.

In this embodiment, each of the wind speed sensors 32*a*, 32*b* and the air pressure sensor 36 take measurements every second, and these measurements are delivered to the controller 20 at a series of discrete time intervals, separated by a series of first time windows, tx, that in this case each have a duration of ten minutes. At the end of each ten minute time window, tx, the controller receives this primary wind speed data in the form of the measurements taken by the wind speed sensors 32*a*, 32*b* and the air pressure sensor 26 during that time window tx. Thus, the controller receives six hundred measurements from each of the wind speed sensors 32*a*, 32*b* and the air pressure sensor 26 at the end of each time window, tx, in this embodiment. It should be noted that in other embodiments the duration of the time window, tx, may vary, and the number of measurements taken by each sensor 32*a*, 32*b*, 36 during each time window, tx, may vary.

At the end of a first ten minute time window, t1, the controller 20 receives the measurements originating from the wind speed sensors 32*a*, 32*b* and the air pressure sensor 36 that were taken during the first time window t1. The controller 20 calculates a ten minute average wind speed value, $WS_{avg,10}$, also referred to as an average primary wind speed value, from the wind speed measurements taken during t1. The controller calculates a ten minute average air pressure value, $AP_{avg,10}$ from the air pressure measurements taken during t1. The controller 20 then computes a ten minute average adjusted wind speed value, $WS_{avg\text{-}adj,10}$, for t1, based on the ten minute average wind speed value $WS_{avg,10}$ for t1 and the ten minute average air pressure value $AP_{avg,10}$ for t1.

At the end of a second ten minute time window, t2, that begins immediately after the first ten minute time window t1 has elapsed, the controller 20 receives the measurements originating from the wind speed sensors 32*a*, 32*b* and the air pressure sensor 36 that were taken during the second time window t2, and the process described above is repeated to determine a ten minute average adjusted wind speed value, $WS_{avg\text{-}adj,10}$, for t2. The same process is repeated seven more times to determine ten minute average adjusted wind speed values $WS_{avg\text{-}adj,10}$ for nine consecutive ten minute time windows, t1 to t9, each of which are stored in the memory device 50.

The controller 20 then calculates a ninety minute average adjusted wind speed value, $WS_{avg\text{-}adj,90}$, also referred to as a second average wind speed value, by averaging the ten minute average adjusted wind speed values $WS_{avg\text{-}adj,10}$ for t1 to t9.

The method then proceeds to step 108, at which step the ninety minute average adjusted wind speed value, $WS_{avg\text{-}adj,90}$, is used to determine an expected power to be generated by the wind turbine 8. That is, with reference to the power curve of the wind turbine 8 stored in the memory device 50 of the controller 20, the controller 20 determines the power that may be expected to be generated by the wind turbine 8 in normal operating conditions, i.e. when no ice is present, for the given ninety minute average adjusted wind speed $WS_{avg\text{-}adj,90}$.

At step 110, the processor 42 generates a ninety minute average actual power, $P_{avg,90}$, using primary power data received from the current and voltage sensors 30*a*, 30*b* that is indicative of the actual power being generated by the wind turbine 8 as follows.

The current and voltage sensors 30*a*, 30*b* take measurements every second during the ten minute time windows, t1 to t9, which are also referred to as first time windows, and these measurements, also referred to as primary power data, are delivered to the controller 20 at the same series of discrete time intervals as are the wind speed and air pressure measurements. That is, the current and voltage data collected during t1 is delivered to the controller at the end of t1, the current and voltage data collected during t2 is delivered to the controller at the end of t2, and so on.

At the end of the first ten minute time window, t1, the controller 20 therefore receives six hundred measurements of current (i.e. one for each second of the ten minute time window t1) and six hundred measurements of voltage (i.e. one for each second of the ten minute time window t1). From these current and voltage values, the controller 20 calculates the actual output power for each second of the ten minute time window t1, and then calculates the average of these output power values to give a ten minute average output power value, $P_{avg,10}$, also referred to as the average primary output power. This process is repeated for the time windows t2 to t9, such that a ten minute average actual output power value, $P_{avg,10}$, is determined for each of the time windows, t1 to t9. These $P_{avg,10}$ values are stored in the memory device 50.

The processor 42 then calculates the average of the nine $P_{avg,10}$ values generated for t1 to t9 to determine a ninety minute average output power value, $P_{avg,90}$, which is also referred to as an average actual power of the wind turbine.

The processor 42 determines the difference between the expected output power and the actual output power, $P_{avg,90}$, at step 112, and this information is stored on the memory device 50 as a power difference data point.

As already noted, whilst in this embodiment the duration of each time window, t1 to t9, is ten minutes, in other embodiments this may vary. Furthermore, the total number of time windows, tx, used to determine the expected output power and the actual output power, $P_{avg,90}$, may vary. As one non-limiting example, in one embodiment the method utilises four time windows, t1 to t4, to determine the expected and actual output values, with each time window having a duration of ten minutes. In another non-limiting example, three time windows, t1 to t3, each having a duration of twenty minutes are used. Many other variations are possible.

At step 114 the processor 42 compares the power difference data point with a threshold value also stored on the memory device 50.

In this embodiment, the threshold value is dependent on the ninety minute average adjusted wind speed value, $WS_{avg-adj,90}$. The memory device 50 of the controller 20 stores reference threshold value data for the wind turbine 8, which comprises a list of the threshold values to be used for different wind speeds, $WS_{avg-adj,90}$. In this embodiment, the different values of wind speed are binned, with each bin having a different associated threshold value. That is, multiple wind speed values are grouped together in bins, and each bin has a different associated threshold value. Bins containing higher wind speeds have higher associated threshold values than bins containing lower wind speed values. It should be noted that in some embodiments of the invention a single threshold value may be used for all values of wind speed, $WS_{avg-adj,90}$, such that the threshold value is independent of wind speed.

The processor 42 determines if the measured difference is less than or greater than the threshold value.

If the power difference data point is determined to indicate that the expected output power exceeded the actual output power by an amount greater than the threshold value, the method proceeds to step 116, which begins a first alternative stream of the method. In other words, if the power difference data point indicates that the actual output power has been below the expected output power on average, based on the comparison to the threshold value, for a first pre-determined period of time, which in this case is equal to ninety minutes, then the method proceeds to step 116. If the power difference data point is determined to indicate that the expected output power has not exceeded the actual output power by an amount greater than the threshold value, in other words the actual power output has not been below the expected power output on average, based on the comparison with the threshold value, then the method proceeds to step 118, which begins a second alternative stream of the method, which will be described later.

Starting with the first stream of the method, at step 116 the controller 20 receives data derived from the ice sensor 28 that indicates whether or not ice is accumulating on the wind turbine 8, and determines whether or not the data indicates that ice has finished accumulating on the wind turbine 8. In this embodiment, the ice sensor 28 sends data to the controller 20 at ten minute intervals. In other embodiments, data from the ice sensor 28 could be sent to the controller 20 at different discrete intervals of time, or continuously. When it is determined at step 116 that ice has finished accumulating on the wind turbine 8, then the controller 20 measures the duration over which it is continuously determined that no ice accumulates at the wind turbine 8. If, after a pre-determined time period which in this case is equal to sixty minutes elapses, and it is determined that ice has begun accumulating again on the wind turbine 8, then the method terminates. If, however, the processor 42 determines that no further ice accumulation has been detected in the predetermined time period of sixty minutes, then the method moves to step 120.

At step 120, the controller 20 receives data from the temperature sensors 34*a*, 34*b* indicative of a current ambient temperature at the wind turbine 8. The processor 42 determines if the measured temperature is within a certain prescribed range of temperatures, or above or below a certain prescribed temperature. In this example, the processor 42 determines whether the ambient temperature in the vicinity of the wind turbine 8 is greater than or less than a prescribed threshold ambient temperature of approximately 0 degrees Celsius. In other examples, other suitable threshold ambient temperatures or ranges may be used. Because step 120 is a repetition of step 104, it can be omitted if desired.

If at step 120 the processor 42 determines that the ambient temperature is above the threshold temperature then the method is terminated, as illustrated. If at step 120 the processor 42 determines that the ambient temperature is below the threshold temperature, the controller 20 sends a control signal to the ice removal system 24 at step 122, to activate the ice-removal system 24.

Now turning to the second stream of the method, at step 118, the controller 20 evaluates the status of the wind turbine connection. For this, the controller 20 receives data from the current and voltage sensors 30*a*, 30*b* at one second intervals over a second pre-determined period of time that in this embodiment is equal to thirty minutes, and calculates a corresponding output power for each one second interval using these values. If the output power is determined to be substantially zero for at least a prescribed percentage of the second pre-determined period of time, then the method proceeds through steps 124, 126 and 128, which are identical to steps 116, 120 and 122, respectively, of the first stream. In this example, the prescribed percentage is 20% of the second pre-determined period of time, and is thus equivalent to the controller 20 receiving at least 360 data points from the current and voltage sensors 30*a*, 30*b* indicating that the output power from the wind turbine 8 is substantially zero.

If the output power is determined to be substantially zero for less than the prescribed percentage of 20% of the second pre-determined period of time, then the method terminates.

In an alternative embodiment of the method, at step 106 the controller receives data from the air pressure sensor 36 indicative of the air pressure in the vicinity of the wind turbine 8 at a single time, or over a single time window, and the processor 42 computes an adjusted wind speed value using the data from the wind speed sensors 32*a*, 32*b* and the air pressure sensor 36. At step 108 of this alternative method, the adjusted wind speed value is used to determine an expected power to be generated by the wind turbine 8 with reference to the power curve that is stored in the memory device 50 of the controller 20.

At step 110 of this embodiment, the controller 20 receives data from the current and voltage sensors 30*a*, 30*b* indicative of the output power at a single time, or over a single time window, and the processor 42 determines the actual power being generated by the wind turbine 8 based on this data. The processor 42 then determines the difference between the expected and actual output power values at step 112, and this information is stored on the memory device 50 as a power difference data point. In this embodiment, the output power data is received by the controller 20 in discrete time intervals of ten minutes, and steps 110 and 112 are repeated until nine power difference data points have been collected and stored in the memory device 50.

At step 114 the processor 42 compares the power difference data comprising the nine power difference data points with a threshold value also stored on the memory device 50, which may be dependent on the adjusted wind speed value. The processor 42 determines, for each data difference point, if the measured difference is less than or greater than the threshold value.

If all of the power difference data points are determined to indicate that the expected output power exceeded the actual output power by an amount greater than the threshold value, the method proceeds to step 116, which begins the first alternative stream of the method. If not all of the power difference data points are determined to indicate that the expected output power exceeded the actual output power by an amount greater than the threshold value, the method proceeds to step 118, which begins the second alternative stream of the method.

As noted already, the described method may be undertaken at any suitable frequency.

In some embodiments, for example those in which the method is undertaken every ten minutes, the expected and actual output powers may be determined using rolling time windows. In this case, taking the described embodiment as an example, a first ninety minute window may include the time windows t1 to t9, a second ninety minute time window may include the time windows t2 to t10, and so on.

In other examples, the expected and actual output powers may be determined using back-to-back time windows. For example, the expected and actual output powers for a first ninety minute window may be determined during a first run of the method. During a second run of the method, the expected and actual output powers for a second ninety minute window may be determined, where the second ninety minute window starts directly after the first ninety minute window has terminated. In this case, the first ninety minute window contains time windows t1 to t9, and the second ninety minute window contains time windows t10 to t19.

The use of averages of the measured wind speed and actual output power values in the method is advantageous, as this prevents small fluctuations in these parameters from unnecessarily triggering activation of the de-icing system.

The described method is advantageous because it optimises the time at which the ice-removal system 24 is activated. That is, the ice-removal system 24 is only activated when it is determined that ice has stopped accumulating on the wind turbine 8, and in particular that ice has stopped accumulating for a certain period of time. This provides a more efficient way of addressing ice removal, because energy is not wasted in removing ice during a period in which ice is still growing. Instead, the invention provides a method in which ice is only removed from the wind turbine 8, and in particular from the wind turbine blades 18, after it is determined that ice has stopped accumulating. Thus, the ice removal process is enabled to be more efficient and effective.

REFERENCE NUMBERS wind turbine 8
nacelle 12
tower 14
main rotor arrangement 16
hub 17
wind turbine blade 18
controller 20
sensors 22
ice-removal system 24
output from ice sensor 26
ice sensor 28
first output power sensor 30*a*
second output power sensor 30*b*
first wind speed sensor 32*a*
second wind speed sensor 32*b*
first temperature sensor 34*a*
second temperature sensor 34*b*
air pressure sensor 36
controller inputs 40
processor 42
output 44
sensor output data 46
control signal 48
memory device 50
temperature sensor output 54
method steps 100, 102, 104, 106, 108, 110, 112, 114, 116, 118, 120, 122, 124, 126, 128, 130, 132

The invention claimed is:

1. A method of activating an ice-removal system of a wind turbine, the method comprising:
monitoring an output power of the wind turbine;
monitoring an output from an ice sensor provided on or in a vicinity of the wind turbine and indicative of an atmospheric icing condition in the vicinity of the wind turbine; and
activating the ice-removal system when the output power is below an expected output power and the output from the ice sensor indicates that an atmospheric icing condition has ended.

2. The method of claim 1, comprising monitoring ambient temperature, and activating the ice-removal system only when an ambient temperature is in a pre-determined range.

3. The method of claim 1, comprising activating the ice-removal system only when the output from the ice sensor indicates that the atmospheric icing condition has been ended for a pre-determined period of time.

4. The method of claim 1, comprising activating the ice-removal system only:

when the output power has been determined to be below the expected output power for a first pre-determined period of time, or when the output power has been substantially zero for a prescribed percentage of a second pre-determined period of time.

5. The method of claim 4, wherein the second pre-determined period of time is less than the first pre-determined period of time.

6. The method of claim 1, wherein monitoring the output from the ice sensor comprises receiving data derived from the ice sensor at a discrete series of time intervals.

7. The method of claim 1, wherein monitoring the output power of the wind turbine comprises receiving data indicative of the output power from the wind turbine.

8. The method of claim 7, wherein monitoring the output power of the wind turbine comprises receiving primary power data indicative of the output power from the wind turbine at a discrete series of time intervals of a first window.

9. The method of claim 8, comprising receiving primary power data for multiple, consecutive, first windows.

10. The method of claim 9, comprising calculating an average primary output power for each first window using the corresponding primary power data for each first window.

11. The method of claim 10, comprising determining an average actual power of the wind turbine by calculating an average value of the average primary output powers.

12. The method of claim 8, wherein the primary power data is received by a controller at the end of the or each first window.

13. A controller for an ice-removal system of a wind turbine, the controller comprising:

an input configured to receive data derived from an ice sensor indicative of an existence of an atmospheric icing condition;

an input configured to receive data indicative of an output power of the wind turbine; and a processor configured to perform an operation, comprising:

determine whether a time period in which an atmospheric icing condition exists has ended;

determine whether the output power of the wind turbine is below an expected output power; and issue an output control signal to activate the ice-removal system when it is determined that the output power is below the expected output power and the atmospheric icing condition has ended.

14. A control system, comprising:

an ice detector; and a controller communicatively coupled to the ice detector, the controller comprising:

an input configured to receive data derived from the ice detector indicative of an existence of an atmospheric icing condition;

an input configured to receive data indicative of an output power of a wind turbine; and a processor configured to perform an operation, comprising:

determine whether a time period in which an atmospheric icing condition exists has ended;

determine whether the output power of the wind turbine is below an expected output power; and issue an output control signal to activate an ice-removal system when it is determined that the output power is below the expected output power and the atmospheric icing condition has ended.

15. A wind turbine, comprising:

a tower;

a nacelle disposed on the tower;

a rotor extending from the nacelle and having a plurality of blades disposed on a distal end thereof;

an ice detector; and a controller communicatively coupled to the ice detector, the controller comprising:

an input configured to receive data derived from the ice detector indicative of an existence of an atmospheric icing condition;

an input configured to receive data indicative of an output power of the wind turbine; and a processor configured to perform an operation, comprising:

determine whether a time period in which an atmospheric icing condition exists has ended;

determine whether the output power of the wind turbine is below an expected output power; and issue an output control signal to activate an ice-removal system when it is determined that the output power is below the expected output power and the atmospheric icing condition has ended.

* * * * *